United States Patent Office 3,470,783
Patented Oct. 7, 1969

3,470,783
DEVICE FOR CUTTING ICE RODS INTO SHORT PIECES
Bo Germund Tallving, Norrkoping, Sweden, assignor to Stal Refrigeration Aktiebolag, Norrkoping, Sweden, a Swedish corporation
Filed Jan. 12, 1968, Ser. No. 697,503
Claims priority, application Sweden, Mar. 17, 1967, 3,732/67
Int. Cl. B26d 1/12; B02c 17/02, 18/06
U.S. Cl. 83—672
2 Claims

ABSTRACT OF THE DISCLOSURE

A cutting device for severing frozen rods into short pieces consisting of a rotary cutter mounted on a periodically rotated shaft, the cutter consisting of a disk having a curved slot extending from the centrally-located shaft to the periphery of the disk, the slot being wider at the said periphery than at the shaft. One of the edges of the slot being sharpened and being elevated above the second edge of the slot, the rods entering the slot when the disk is rotated and being cut off by contact with the sharpened edge.

---

The invention relates to a device for use in icemaking machines in which water is frozen into rod shapes in vertical tubes and the ice rods are periodically loosened and are cut into short pieces by a rotating ice cutter. Such cutter comprises a disk in the form of a helix and which presents a slot that extends from the center of the disk to the periphery of the same and has slot edges which are vertically displaced relative to each other.

Up to the present time, the cutting-off operation has been achieved by the use of a cutter arm mounted on a shaft, which when rotated, cuts the ice-rods into short sections. The disadvantage of such an arrangement has been that the ice pieces have been smashed against the surrounding casing and were thus broken up into small particles or flakes, which is not desirable.

The main purpose of the present invention is to cleanly cut off the pieces and to prevent them from being broken up into small particles or flakes, and the invention is characterized in that the slot in the disk is curved in the direction of rotation of the same and the upper edge of the slot, which edge is the cutting edge, is provided with a sharpened edge. Said edge is radially directed at the center of the disk, while the remainder of said edge is arc shaped, and along a curve so constructed that the angles between the tangents of the curve and the radius of the disk increase by the distance from the center of the disk.

With these and other objects to be hereinafter set forth in view, I have devised the arrangement of parts to be described and more particularly pointed out in the claims appended hereto.

Figure 1:
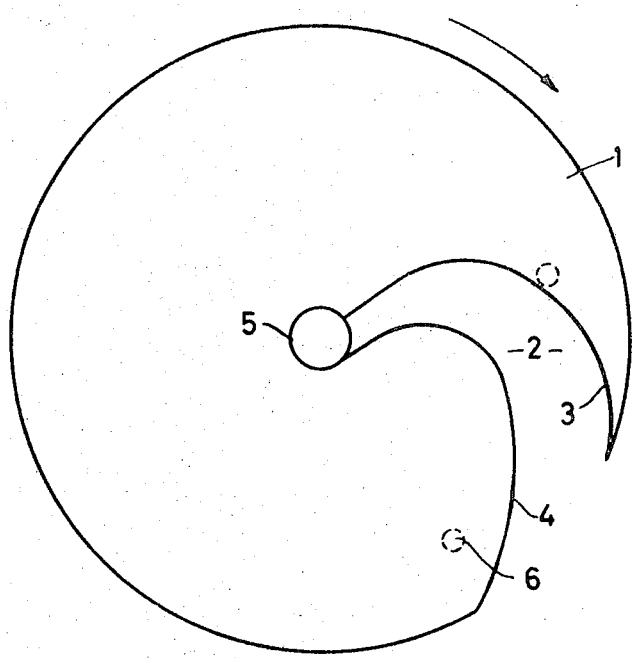
Figure 2:
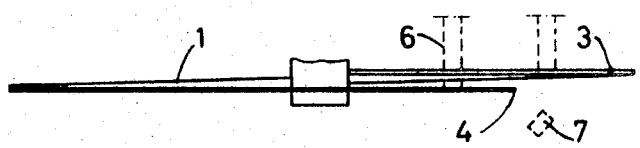

In the accompanying drawing, wherein an illustrative embodiment of the invention is disclosed, FIG. 1 is a top plan view of the cutting disk, and
FIG. 2 shows the disk seen from the side.

The disk 1, composed of metal, is provided with a slot 2, which is curved from the center of the disk to the periphery of the same in the direction of rotation in such a way that one of the edges of the slot, or that shown at 3, which is provided with a sharpened or cutting edge, is half-moon shaped. The disk is also shaped helically with its edges 3 and 4 vertically displaced relative to each other, as is clearly shown in FIG. 2. Two ice rods are shown at 6 and 7 shows a cut-off piece of ice.

When the disk is rotated, either periodically or constantly, the cutting edge 3 contacts with the rods and severs them into small pieces. An ice cutter made in accordance with the invention prevents the ice pieces 7 from being thrown against the casing of the ice-making machine, and which usually causes the pieces to be broken up into small particles or flakes. Instead, the ice pieces cut off by the present arrangement, are spread evenly on a surface located below the ice cutter. This not only results in power consumption decrease but also an increase in the production of whole ice pieces without the forming of troublesome ice particles or flakes.

The disk is carried on a rotative shaft 5 which can be rotated periodically or constantly according to cutting requirements.

What I claim is:
1. A device for use in ice-making machines in which water is frozen to form ice rods in vertical tubes and the ice rods are periodically loosened by defreezing and are cut into pieces by a rotary ice cutter, the cutter comprising a disk in the form of a helix and presenting a slot which extends from the center of the disk to the periphery of the same, said slot being defined by edges which are vertically displaced relative to each other, the slot being curved in the direction of rotation of the disk, and the upper edge of the slot being the ice cutter is provided with a cutting edge, said edge being substantially radially directed at the center of the disk, while the remainder of said edge is arc shaped along a curve so constructed that the angles between the tangents of the curve and the radius of the disk increase by the distance from the center of the disk.

2. A device according to claim 1, wherein the disk has a center shaft, the slot having an inner end terminating at the shaft, and the slot is wider at the periphery of the disk than it is at the shaft.

References Cited

UNITED STATES PATENTS

Re. 20,952   12/1938   Smith _____ 241—92
2,075,522    3/1937    Hughes _____ 241—92

JAMES M. MEISTER, Primary Examiner

U.S. Cl. X.R.
146—61, 124; 241—92